United States Patent [19]

Musow

[11] Patent Number: 5,213,663
[45] Date of Patent: May 25, 1993

[54] METHOD FOR CONTROLLING THE SODIUM CARBONATE CONCENTRATION OF GREEN LIQUOR IN THE DISSOLVING TANK

[75] Inventor: Wolf Musow, Plymouth, Mass.

[73] Assignee: The Foxboro Company, Foxboro, Mass.

[21] Appl. No.: 734,183

[22] Filed: Jul. 22, 1991

[51] Int. Cl.$^5$ ............................................. D21C 7/14
[52] U.S. Cl. .................................. 162/49; 162/30.11; 162/43; 162/44; 162/45
[58] Field of Search .................... 423/432, DIG. 3; 162/25, 30.1, 30.11, 43, 44, 45, 49, 62, 238, 263

[56] References Cited

U.S. PATENT DOCUMENTS 4,236,960 12/1980 Hultman et al. ........................ 162/30
4,311,666 1/1982 Hultman et al. ........................ 422/62

FOREIGN PATENT DOCUMENTS

WO84/04552 11/1984 PCT Int'l Appl. ..

OTHER PUBLICATIONS

Theliander, "A System Analysis of the Chemical Recovery Plant of the Sulfate Pulping Process" (1989) Nordic Pulp/Paper Research Journal No. 4, pp. 263-271.

Dorris, et al., "Conductivity Sensors for Slaker Control: Part 1—Laboratory Results" (Jul. 1989) Journal of Pulp/Paper Science 15:4, pp. 122-131.

Musow et al., "Recausticizing Control Utilizing Torodial Magnetic Sensor Technology and Controller With Artificial Intelligence" (1985) Engineering Conference Book 1, Tappi Press, pp. 199-209.

Primary Examiner—W. Gary Jones
Assistant Examiner—Brenda Lamb
Attorney, Agent, or Firm—Fish & Richardson

[57] ABSTRACT

A method for regulating the sodium carbonate concentration of a green liquor in the dissolving tank of the Kraft recovery process by measuring the conductivity of the green liquor from the dissolving tank, measuring the conductivity and flow rate of a weak wash solution being added to the green liquor in the dissolving tank, using these measurements to determine the sodium carbonate concentration of the green liquor in the dissolving tank, and adjusting the volume of the weak wash solution being added to the dissolving tank in response to changes in the concentration of sodium carbonate in the green liquor so as to maintain the concentration of sodium carbonate in the green liquor at a predetermined, preferably constant, level.

5 Claims, 2 Drawing Sheets

METHOD FOR CONTROLLING THE SODIUM CARBONATE CONCENTRATION OF GREEN LIQUOR IN THE DISSOLVING TANK

BACKGROUND OF THE INVENTION

This invention relates to the control of the sodium carbonate concentration of the green liquor of the Kraft recovery process.

In the production of paper pulp, cellulosic fibrous material, generally wood chips, is digested in an NaOH-containing solution (white liquor). This digestion yields pulp and, as a by-product, black liquor. The Kraft recovery process is widely used to recover, from the black liquor, chemicals used in the production of paper pulp and recycle these chemicals to the pulping process. Briefly, black liquor is concentrated and then combusted to produce smelt. In a dissolving tank, the smelt is dissolved in weak wash to form green liquor, the primary component of which is $Na_2CO_3$. The green liquor is then reacted with lime (CaO) in a causticizing reaction to convert $Na_2CO_3$ to NaOH. The reacted mixture then passes to a clarifier which separates the liquid phase, which is essentially the white liquor, from the solid phase which is primarily $CaCO_3$ and is referred to as lime mud. The white liquor is recycled and used for digestion of wood chips at the beginning of the cycle. The lime mud is washed to remove traces of white liquor prior to being passed to a lime kiln where CaO is regenerated. The overflow water from the washing of the lime mud is the weak wash used to dissolve the smelt in the dissolving tank.

It is desirable to have a highly efficient causticizing reaction as this increases the yield of white liquor and brings about a number of benefits in energy efficiency, productivity, and reduced emission of air pollutants. In a highly efficient causticizing reaction, $Na_2CO_3$ is efficiently converted to NaOH. Ideally the causticizing reaction is regulated so that the causticity (i.e., $100 \times [NaOH]/([NaOH]+[Na_2CO_3])$, wherein all concentrations are expressed as $Na_2O$) is maintained near its equilibrium value. For most Kraft mills the equilibrium value is between 80% and 90% causticity. The efficiency of causticization can be increased in a number of ways including increasing the length of the causticization reaction, and balancing the CaO feed with the sodium carbonate feed (from the green liquor in the dissolving tank).

Attempts have been made to improve the causticizing efficiency by measuring the sodium carbonate concentration of both the green and white liquors and using this information to adjust the rate of CaO addition so as to maintain a particular level of causticization in the white liquor.

Alternatively, the sodium carbonate concentration of the green liquor is controlled. In adjusting the sodium carbonate concentration of the green liquor, the weak wash flow into the dissolving tank is the controlled variable.

Thus, if the sodium carbonate concentration in the dissolving tank is too high, the weak wash flow is increased; and when the sodium carbonate concentration is too low, the weak wash flow is decreased. Conventionally, the density of the green liquor, not the $Na_2CO_3$ concentration, is used to determine the need for increased or decreased dilution of the green liquor.

Speaks et al. (U.S. application Ser. No. 84/00739) describe a process and apparatus for measuring the carbonate concentration in the green liquor, the white liquor, the slaker, and the causticizer and then using this information to control the causticizing reaction. As a part of this process, the concentration of $Na_2CO_3$ in the green liquor is measured and regulated. The $Na_2CO_3$ concentration in the green liquor is determined by drawing off and filtering green liquor, collecting a sample of filtered green liquor, reacting the sample with acid thereby producing carbon dioxide and hydrogen sulfide, and then measuring the carbon dioxide so produced using a gas chromatograph. The process takes 15-20 minutes and it is suggested the results of this analysis may be used as a set point control input to primary controllers such as conductivity probes or density gauges.

Hultmann et al. (U.S. Pat. No. 4,311,666) describe an apparatus for controlling causticization by determining the sodium carbonate concentration of both the green liquor and the white liquor, and using this information to adjust the CaO flow to the slaker. In this approach, the sodium carbonate concentration of the green liquor is determined by acidifying a sample of green liquor and measuring the carbon dioxide liberated.

SUMMARY OF THE INVENTION

In general, the invention features a method for estimating the sodium carbonate concentration in the dissolving tank and using this information to adjust the flow of weak wash solution to the dissolving tank so that the sodium carbonate concentration in the dissolving tank can be maintained at a pre-determined, preferably constant, level.

The method of the invention takes advantage of the fact that although there are two compounds present in the dissolving tank in addition to sodium carbonate, the concentration of sodium carbonate can be estimated by measuring the conductivity of the green liquor and the weak wash using a conductivity probe. This approach obviates the need for sophisticated compound (or ion) specific sensors, which are required if one is to directly measure the concentration of one or more of the compounds.

In the method of the invention, the sodium carbonate concentration of a green liquor in a dissolving tank can be regulated by measuring the conductivity of the green liquor in the dissolving tank, measuring the conductivity and flow rate of the weak wash solution being added to the green liquor in the dissolving tank, using these measurements to determine the sodium carbonate concentration of the green liquor, and then adjusting the volume of the weak wash solution added to the dissolving tank in response to changes in the concentration of sodium carbonate in the green liquor so as to maintain the concentration of sodium carbonate in the green liquor at a pre-determined, preferably constant, level.

The above-described method regulates sodium carbonate concentration based on measurements that are more accurate than such indirect measures as the density of the green liquor or total titratable alkali in the green liquor. Since the strategy is based on continuous on-line measurements, it is possible to continually regulate the sodium carbonate concentration in the dissolving tank.

Other features and advantages of the invention will be apparent from the following description of the preferred embodiments thereof, and from the claims.

DETAILED DESCRIPTION

The drawings are first briefly described.

Figure 1:
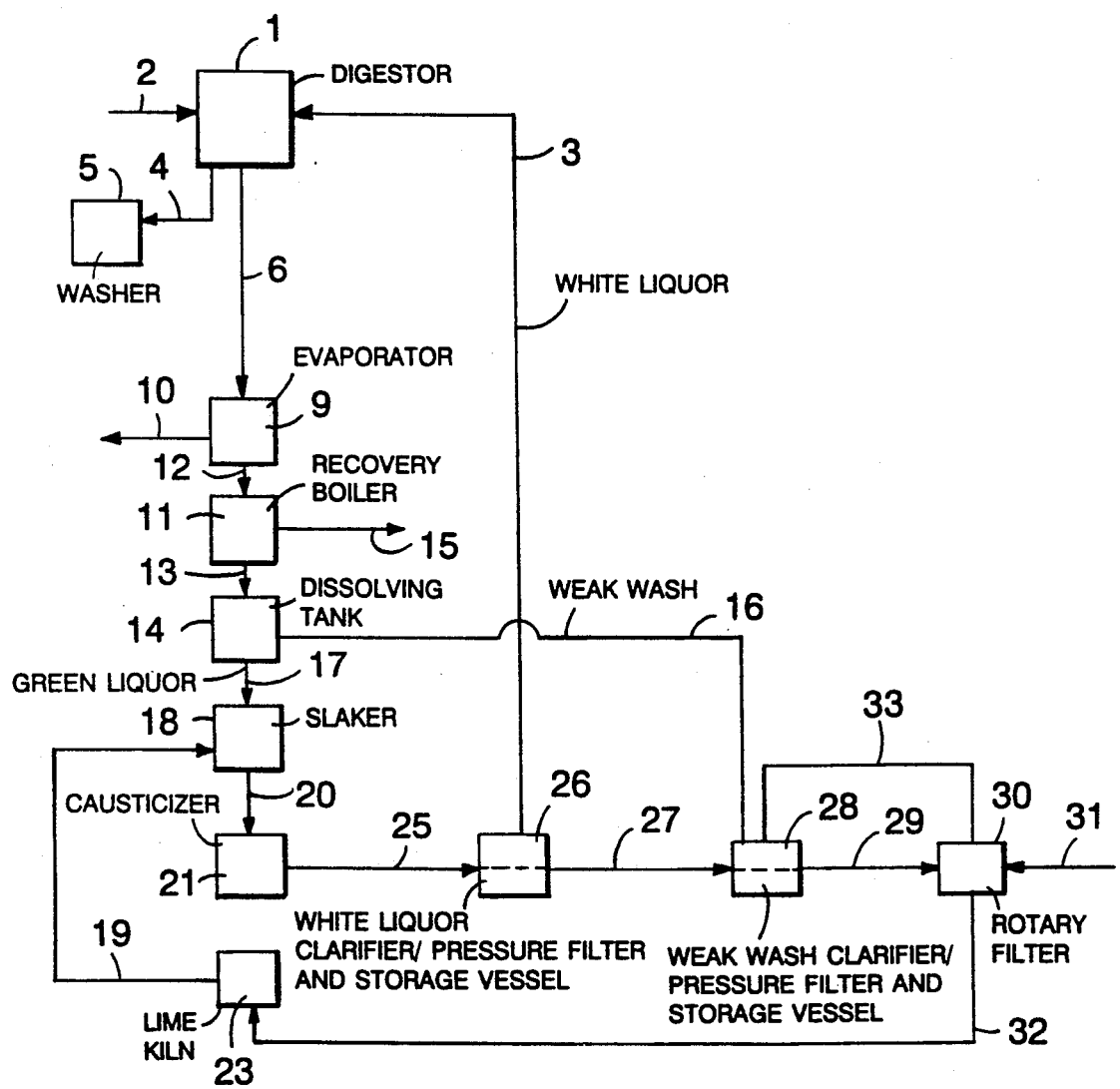
FIG. 1 is a schematic view of a portion of a pulp mill operation including the various components and piping involved in the Kraft recovery process.

The method of the invention takes advantage of the fact that although there are three primary compounds present in the dissolving tank, the concentration of sodium carbonate can be estimated using a non-specific sensor, e.g., a conductivity probe.

The method of the invention can be more clearly understood by considering the composition of the green liquor in the dissolving tank. In the dissolving tank green liquor is formed by combining smelt and weak wash. The three primary compounds in the dissolving tank are: sodium carbonate, sodium hydroxide, and sodium sulphate. Of course, a conductivity measurement of the green liquor will detect all three compounds, not just sodium carbonate. However, the fact that the compounds in the green liquor are contributed by different sources permits a non-selective conductivity measurement to be corrected and used to estimate the sodium carbonate concentration in the dissolving tank. While both the smelt and the weak wash are the source of sodium sulphate, the only source of sodium hydroxide is the weak wash, and the smelt is the only source of sodium carbonate. Accordingly, it is possible to calculate the sodium carbonate concentration simply by measuring the conductivity of green liquor exiting the dissolving tank and correcting the measurement for sodium hydroxide and sodium sulphate. The correction for sodium hydroxide is made using on-line measurements of both the conductivity and flow rate of the weak wash solution being added to the dissolving tank. The correction for sodium sulphate is simplified by the fact that concentration of sulphur in the dissolving tank changes very gradually (and over a rather narrow range). Thus, off-line sulphidity data, which is routinely obtained through scheduled analysis, can be used to correct dissolving tank conductivity data for sodium sulphate content.

The conductivity of any solution depends on its temperature. Accordingly, each of the conductivity measurements must be corrected to a reference temperature using appropriate temperature compensation curves. In this manner changes in conductivity caused by temperature variation can be distinguished from conductivity changes caused by concentration changes. Preferably, the reference temperature is relatively close to the operating temperature. For example, 85° C. is an appropriate reference temperature for the green liquor, and 25° C. is an appropriate reference temperature for the weak wash solution. In practice the conductivity signal is automatically temperature compensated to the appropriate reference temperature prior to the computation of sodium carbonate concentration. The various measurements are conveyed to a programmed computer which calculates an estimate of the sodium carbonate concentration in the green liquor according to a prescribed algorithm and then provides a signal to a controller which adjusts the flow of weak wash into the dissolving tank.

The temperature-compensated conductivity data, the off-line sulphidity data, and the flow of weak wash to the dissolving tank can be used to calculate the green liquor carbonate concentration according to the following algorithms:

$$C_{C85} = C_{G85} - (C_{W25} \times F_w \times a_w) - (S_G \times a_s) \quad (1)$$

$$K_c = C_{C85} \times a_c \quad (2)$$

where:

$K_C$ green liquor sodium carbonate ($Na_2CO_3$) concentration expressed in $Na_2O$ g/L $C_{G85}$ green liquor conductivity compensated to a special non-linear green liquor temperature compensation curve and referenced to an elevated reference temperature of 85° C.

$C_{C85}$ green liquor carbonate conductivity referenced to an elevated reference temperature of 85° C. and compensated for sodium hydroxide and sulphidity $C_{W25}$ weak wash conductivity referenced to a non-linear sodium hydroxide temperature compensation curve and referenced to a temperature of 25° C.

$a_C$ coefficient for green liquor sodium carbonate at 85° C.

$a_W$ coefficient for weak wash at 25° C.

$a_S$ coefficient for green liquor sulphidity $S_G$ green liquor sulphidity expressed in percent as $Na_2O$ $F_W$ weak wash flow in L/min Conductivity, temperature, and flow rate can be measured in any convenient manner. It is understood that the sensors must be both temperature and chemical resistant. Preferred conductivity sensors are electrodeless conductivity sensors also known as toroidal conductivity probes (e.g., those available from The Foxboro Company, Foxboro, Mass.). Direct contact electrodes may also be used but are less preferred. The weak wash flow can be measured using any suitable device including a magnetic flow meter, an orifice meter, or a vortex meter. Alternatively, the flow rate can be estimated from position of the valve used to control weak wash flow. Temperature compensation curves for green liquor and weak wash are prepared in the laboratory based on their average composition. Preferably, customized compensation curves are prepared for each facility using the process.

Because each mill is slightly different the coefficients in the above algorithms are usually specific for a particular mill. The green liquor density can be expressed in terms of specific gravity, total titratable alkali, or any other convenient conventional term and subsequently converted to the sodium carbonate concentration in terms of $Na_2O$. To determine the correct coefficients the following data is collected at a number of time points: temperature-compensated conductivity of the green liquor, temperature-compensated conductivity of the weak wash, weak wash flow, total sulphidity, and green liquor density (in terms of specific gravity or total titratable alkali if desired). Regression analysis is then used to calculate the coefficients. It may be possible to find a set of average coefficients that are suitable for a large number of mills.

Once the sodium carbonate concentration of the green liquor has been determined it can be used to control the flow of weak wash solution in much the same manner as a density measurement is used currently.

Preferred controllers include proportional-integrative-derivative (PID) controllers and pattern-recognizing, self-tuning PID controllers (U.S. Pat. No. 33,267, "Pattern-Recognizing Self-Tuning Controller", reissued Jul. 17, 1990).

It should be understood that in many instances regulation of the sodium carbonate concentration of the green liquor can be significantly improved by the method of the invention using a somewhat simpler calculation than that described above. For example, good regulation can be achieved even in the absence of off-line sulphidity data. This is because total sulphidity does not vary greatly over the course of several days or weeks. Thus, one can eliminate the sulphidity correction and still obtain good results. Likewise it is not necessary to employ a flow meter to continously measure the weak wash flow. Instead, the flow rate can be estimated from the size of the line and the position of the valve controlling weak wash flow.

EXAMPLE

The method used to control sodium carbonate concentration can best be understood by reference to FIG. 1 which is a diagrammatic view of a portion of a pulp mill operation including the Kraft recovery process. The illustration of the Kraft recovery process has been somewhat simplified for clarity; for example, a green liquor clarifier is often interposed between the dissolving tank and the slaker, and there are usually several causticizers.

Raw cellulosic material is delivered to a digester 1 via line 2. In the digester it is digested with white liquor (alkaline pulping liquor) delivered via line 3. Cellulose pulp fibers are liberated during the digestion process and are conducted via line 4 to a washer 5 for further treatment. Black liquor created in the digestor is drawn off via line 6 and delivered to the evaporator 9. This black liquor is the source of chemicals which are recycled in the Kraft recovery process. The black liquor is first concentrated in the evaporator by the application of heat; the resulting steam is drawn off via line 10. The concentrated black liquor is delivered to a recovery boiler 11 via line 12. In the recovery boiler the concentrated black liquor is combusted; forming a smelt which is drawn off via line 13 and conducted to a dissolving tank 14. The steam produced in the boiler is drawn off via line 15. In the dissolving tank the smelt is dissolved in weak wash delivered via line 16 forming green liquor which is drawn off via line 17 and delivered to a slaker 18, where it is mixed with calcium oxide delivered via line 19. The mixture then passes via line 20 to a causticizer 21. In the causticizer calcium oxide reacts with the green liquor to form liquid sodium hydroxide (white liquor) and lime solids. The liquid sodium hydroxide is drawn off from the causticizer 21 via line 25 and delivered to a white liquor clarifier/storage vessel 26. Clear liquid (white liquor) from the upper portion of the white liquor clarifier/storage vessel is passed via line 3 to the digester 2. In some installations, a pressure filter is used instead of a clarifier. The heavier portion of the liquid in the white liquor clarifier/storage vessel is concentrated in solids and is removed via line 27 to a weak wash clarifier 28. The heavier portion of the liquid in the weak wash clarifier is relatively concentrated in lime mud solids and is passed via line 29 to a rotary filter 30 where the lime mud solids are washed with water admitted via line 31. The washed and dewatered lime mud solids are recycled to the lime kiln 23 via line 32. The lime kiln 23 combusts the lime mud solids to reform calcium oxide which is recycled to the slaker 18 via line 19. The filtrate from the rotary filter 30 is recycled via line 33 to the weak wash clarifier 28. The clarified liquid from the upper portion of the weak wash clarifier is the weak wash which is sent via line 16 to the dissolving tank 14.

With reference to the above-described arrangement, the temperature and conductivity of the green liquor is measured in line 17, and the temperature, conductivity and flow rate of the weak wash is measured in line 16. Off-line sulphidity data is obtained from routine samples of the green liquor in the dissolving tank 14 (or in line 17). These measurements provide the information required to estimate the sodium carbonate concentration of the green liquor in the dissolving tank 14 and adjust the weak wash flow in line 16 accordingly.

Figure 2:
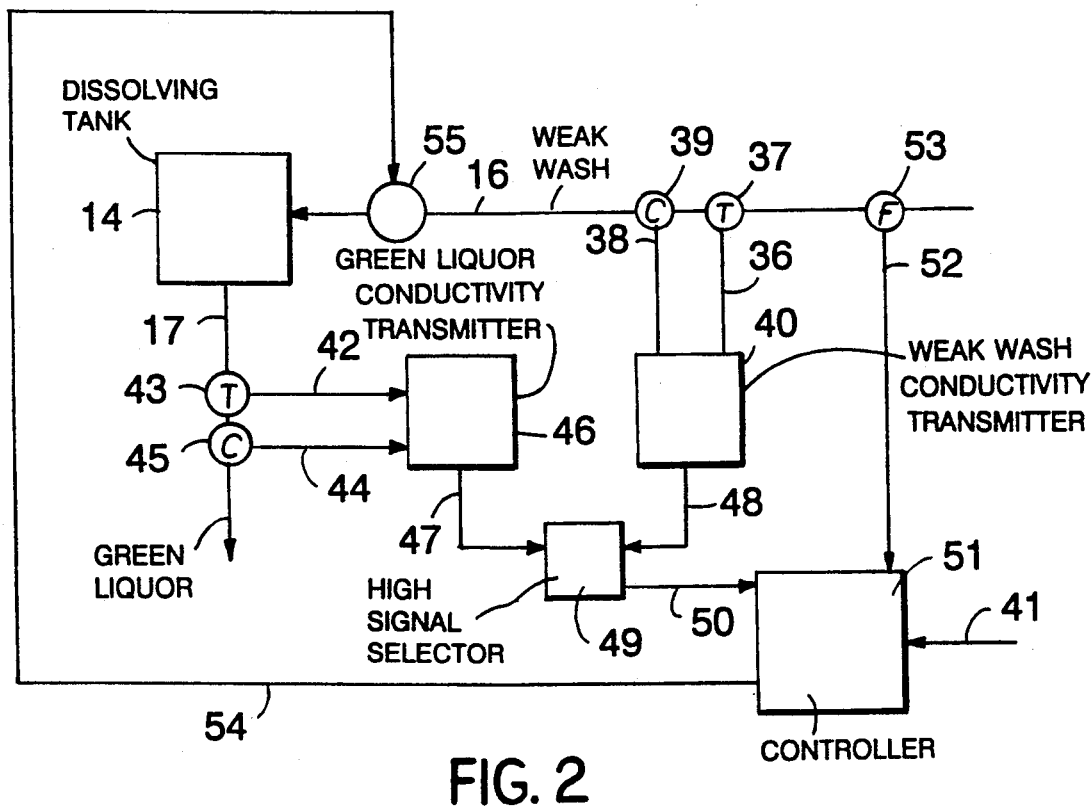
FIG. 2 is a schematic view of the various components and piping involved in a process for regulating the sodium carbonate concentration of the green liquor in the dissolving tank.

The method used to control the sodium carbonate concentration of the green liquor in the dissolving tank can be more completely understood by reference to FIG. 2, which is a schematic representation of the devices used to estimate and control the sodium carbonate concentration in the dissolving tank.

A weak wash conductivity transmitter receives a temperature signal 36 from a temperature probe 37, and an absolute weak wash conductivity signal 38 from a conductivity probe 39. Both probes are located in line 16, which carries weak wash to the dissolving tank 14. A green liquor conductivity transmitter 46 receives a temperature signal 42 from a temperature probe 43 and an absolute green liquor conductivity signal 44 from a conductivity probe 45. Both probes are located in line 17, which draws-off green liquor from the dissolving tank 14. The weak wash conductivity transmitter 40 compensates the absolute weak wash conductivity signal 38 for the effect of variations from a reference temperature of 25° C. and sends a compensated weak wash conductivity signal 48 to a high signal selector 49. In a similar fashion green liquor conductivity transmitter 46 compensates the absolute green liquor conductivity signal 44 with respect to a reference temperature of 85° C. and sends a compensated green liquor conductivity signal 47 to the high signal selector 49. The high signal selector 49 sends compensated green liquor and weak wash conductivity signals 50 to a controller 51 which also receives a flow signal 52 from a flow meter 53 in weak wash line 16. The controller 51 also receives a sulphidity signal 41 which is entered manually and is based on an off-line measurement. The controller 51 uses these signals to estimate the sodium carbonate concentration of the green liquor in the dissolving tank 14. The controller then sends a control signal 54 to valve 55 in line 16, which line delivers weak wash to the dissolving tank 14. When the sodium carbonate concentration in the dissolving tank 14 is above the desired level, the control signal 54 opens valve 55, admitting more weak wash to the dissolving tank 14. Conversely, when the sodium carbonate concentration in the dissolving tank 14 is below the desired level, the control signal 54 closes valve 55, admitting less weak wash to the dissolving tank 14.

The high signal selector 49 is required only in those instances where the dissolving tank is serviced by two pumps which alternate their service between weak wash and green liquor. For example, for six days pump A pumps green liquor from the dissolving tank to the slaker while pump B sends weak wash to the dissolving tank. During this period, the weak wash flow cleans pipes, sensors, and pumps, and flushes away the sodium carbonate scale built-up during the alternate cycle. In the alternate cycle, pump B draws green liquor from the dissolving tank to the slaker, while pump A brings weak wash to the dissolving tank. When such an arrangement is employed, both conductivity probes will be exposed to either green liquor or weak wash. While this has the advantage of providing for routine cleaning of the sensors, it requires that the device computing the sodium carbonate concentration know which solution a given sensor is being exposed to at any given time. Because the conductivity of the green liquor is always higher than the conductivity of the weak wash, the signals can be distinguished by means of a high signal selector.

Installation of Conductivity Probes

A number of factors should be taken into consideration when installing conductivity probes in the green liquor and weak wash lines. Important objectives include: maintaining a reasonable and relatively constant flow rate past the probe, insuring that the probe remains fully submerged, and preventing large buildup of solids which can interfere with conductivity measurements.

Generally for both weak wash and green liquor a small stream (e.g., 1 inch) is drawn-off the appropriate line on the discharge side of the transfer pump serving that line. The stream is feed into one end of a measuring chamber near the bottom of the chamber. The stream exits the measuring chamber and returns to the main line through a primary discharge line at the opposite end of the chamber, near the top. The conductivity and temperature probes are suspended in the measuring chamber so that they are adequately immersed in the stream. A weir at the discharge end of the measuring chamber ensures that the level of green liquor or weak wash in the chamber remains constant. The top edge of the weir is below the level of the primary discharge line. The lower edge of the weir is provided with a cut-out. The cut-out allows settled solids to flow out of the chamber at the discharge end through a secondary discharge line located near the bottom of the discharge end of the measuring chamber.

The sensing portions of toroidal conductivity probes are ring shaped. Accordingly, the probe is preferably installed so that the plane of the ring is at a slight angle to the perpendicular. This discourages the settling of solids on the surfaces of the probe. For an improved signal to noise ratio the plane of the ring should not be orthogonal to the axis of the flow of fluid through the measuring chamber. Finally the probe should be installed so that the clearance between the probe and the walls of the chamber is sufficient to prevent interference with conductivity measurements.

The foregoing description is intended to be only illustrative of one implementation of the process according to the invention. Any number of variations and modifications are possible without departing from the principle of the invention. For example, other types of conductivity probes or measurement systems can be employed without affecting the principle of operation. The scope of the invention is indicated, of course, by the appended claims and equivalents thereto.

I claim:

1. A method for regulating the sodium carbonate concentration of a green liquor from a dissolving tank in a Kraft recovery process comprising:
   (a) measuring the conductivity of said green liquor,
   (b) measuring the conductivity and flow rate of a weak wash solution being added to said dissolving tank,
   (c) determining the sodium carbonate concentration of said green liquor based on said green liquor conductivity adjusted by a factor that is a function of said weak wash conductivity and said weak wash flow rate, and
   (d) adjusting said flow rate of said weak wash solution being added to said dissolving tank in response to changes in the sodium carbonate concentration in said green liquor to maintain the sodium carbonate concentration in said green liquor at a predetermined level.

2. The method of claim 1 wherein said predetermined level is substantially constant.

3. The method of claim 1 wherein said step of measuring conductivity of said green liquor and step of measuring conductivity of said weak wash solution is conducted on-line.

4. The method of claim 1 further comprising a step of measuring the sulphidity of said green liquor.

5. The method of claim 4 wherein said step of determining the sodium carbonate concentration includes calculating the green liquor sodium carbonate concentration, $K_C$ according to the following formula:

$$K_C = a_C \times \{C_{G85} - (C_{W25} \times F_W \times a_W) - (S_G \times a_S)\}$$

wherein:
   $K_C$ is said green liquor sodium carbonate ($Na_2CO_3$) concentration expressed in $Na_2O$ g/L,
   $C_{G85}$ is the conductivity of said green liquor compensated to a special non-linear green liquor temperature compensation curve and referenced to an elevated reference temperature of 85° C.,
   $C_{W25}$ is the conductivity of said weak wash referenced to a non-linear sodium hydroxide temperature compensation curve and referenced to a temperature of 25° C.,
   $a_C$ is a coefficient for green liquor sodium carbonate at 85° C.,
   $a_W$ is a coefficient for weak wash at 25° C.,
   $a_S$ is a coefficient for green liquor sulphidity,
   $S_G$ is said sulphidity of said green liquor expressed in percent as $Na_2O$, and
   $F_W$ is said weak wash flow in L/min.

* * * * *

UNITED STATES PATENT AND TRADEMARK OFFICE
CERTIFICATE OF CORRECTION

PATENT NO. : 5,213,663
DATED : May 25, 1993
INVENTOR(S) : Wolf Musow

It is certified that error appears in the above-indentified patent and that said Letters Patent is hereby corrected as shown below:

On the title page, Item [56]: References Cited, U.S. Patent Documents, add --4,536,253 8/1985 Bertelsen 162/30.11--.

Signed and Sealed this

Thirty-first Day of May, 1994

Attest:

BRUCE LEHMAN

Attesting Officer

Commissioner of Patents and Trademarks